(12) United States Patent
Silvester

(10) Patent No.: US 8,797,265 B2
(45) Date of Patent: Aug. 5, 2014

(54) GYROSCOPE CONTROL AND INPUT/OUTPUT DEVICE SELECTION IN HANDHELD MOBILE DEVICES

(75) Inventor: Gary Silvester, Burnaby (CA)

(73) Assignee: Broadcom Corporation, Irvine, CA (US)

( * ) Notice: Subject to any disclaimer, the term of this patent is extended or adjusted under 35 U.S.C. 154(b) by 693 days.

(21) Appl. No.: 13/044,071

(22) Filed: Mar. 9, 2011

(65) Prior Publication Data

US 2012/0229380 A1    Sep. 13, 2012

(51) Int. Cl.
*G06F 3/033* (2013.01)

(52) U.S. Cl.
USPC .......................................................... 345/158

(58) Field of Classification Search
None
See application file for complete search history.

(56) References Cited

U.S. PATENT DOCUMENTS

| | | | |
|---|---|---|---|
| 6,882,335 B2* | 4/2005 | Saarinen | 345/156 |
| 8,189,818 B2* | 5/2012 | Takahashi et al. | 381/122 |
| 2010/0008523 A1* | 1/2010 | Demuynck et al. | 381/182 |
| 2011/0216093 A1* | 9/2011 | Griffin | 345/659 |
| 2011/0316768 A1* | 12/2011 | McRae | 345/156 |

* cited by examiner

*Primary Examiner* — Jason Olson
(74) *Attorney, Agent, or Firm* — Garlick & Markison; Bruce E. Garlick

(57) ABSTRACT

A technique to provide a duplicate I/O device along an adjacent edge of a handheld mobile device to ensure that at least one I/O device is not obscured by a user when the user's hand grasps the handheld mobile device. Depending on which of the portrait or landscape orientation is relative to the user, a sensing device senses the orientation and sends a position signal to a control circuit. The control circuit controls a switching device that controls which of the I/O devices is to be activated depending on the orientation.

20 Claims, 4 Drawing Sheets

GYROSCOPE CONTROL AND INPUT/OUTPUT DEVICE SELECTION IN HANDHELD MOBILE DEVICES

BACKGROUND OF THE INVENTION

1. Technical Field of the Invention

The present invention relates generally to mobile devices and, more particularly, to handheld communication and/or media devices.

2. Description of Related Art

As the world becomes more mobile, a variety of devices are available to allow individuals to communicate with one another or allow the individuals to access a number of different media sources, including audio and video entertainment sources. Smart phones are available, not only to allow individuals to talk to one another, but also to download music, videos, television programs and movies. Smartphones also now allow individuals to access the Internet and access various sites on the web. Furthermore, Internet access allows individuals to reach and interact with social sites, such as Facebook™. Today's smartphones also incorporate cameras so that photo and video images can be transmitted to others.

Likewise other devices are available to perform various functions noted above, which lets a user perform a variety of tasks that involve audio, video and other file sharing with others connected to the user through various communication channels. For example, handheld media accessing devices are now utilized for accessing various media sources. Such handheld devices include tablet devices, tablet PCs (personal computers) and book readers, just to name a few.

With these various handheld devices, the viewing screen is a touch sensitive screen that allows a user to provide user input through tactile interaction, typically by touching the display with a finger. The screen area is typically rectangular in shape and allows a user to rotate the device for either portrait or landscape orientation. The display image will then adjust to either orientation, depending on how the device is held. In most of these devices, some mechanism will sense the difference in how the device is held by the user to provide the correct orientation.

However, with these handheld devices, typically only one particular type of input/output (I/O) device (or sensor) is present for the device. For example, only one microphone or one speaker is present on the face of the device. One exception is a smartphone that now incorporates a camera on the side with the display facing the user and a second camera on the opposite side facing away from the user. None of these devices duplicate an I/O device on the display side facing the user.

A problem with having only one particular I/O device type on the side having the display is that one or more of these device(s) may be covered when the handheld device is rotated to a different orientation. For example, a camera at a top face edge of a tablet device in one orientation (e.g. landscape orientation) may be covered by the user's hand(s) when rotated to a second orientation (e.g. portrait orientation). Even if the camera is not covered by a hand, the second orientation places the camera at a side edge, which is not a desirable location for video communication. The same type of situation may occur with other I/O devices, such as a microphone and/or a speaker.

Therefore, a need exists to provide a more user friendly location of I/O device(s) in a handheld device that takes into account the orientation of the display.

SUMMARY OF THE INVENTION

The present invention is directed to apparatus and methods of operation that are further described in the following Brief Description of the Drawings, the Detailed Description of the Invention, and the Claims. Other features and advantages of the present invention will become apparent from the following detailed description of the embodiments of the invention made with reference to the accompanying drawings.

DETAILED DESCRIPTION OF THE INVENTION

The embodiments of the present invention may be practiced in a variety of settings that utilize a handheld mobile device with one or more input and/or output (I/O) device(s) (may also be referred to as sensors) located on the handheld mobile device. The I/O device may be a sensor that detects and provides input, such as a microphone or camera, and/or an output device such as a speaker. However, the I/O device need not be limited to those examples described herein and other I/O devices and sensors may be utilized as well. Furthermore, the embodiments of the invention described herein pertain to smartphones and tablet devices, such as tablet PCs, media viewing tablets and book readers, but the invention is not limited to just these described devices. Other handheld devices may utilize the invention. In addition, although the embodiments of the invention described herein pertain to handheld mobile devices, other devices, handheld or not, may also implement the invention. Finally, although a gyroscope is described herein to detect the position or orientation of the handheld device, other position or orientation sensing devices or techniques may be used as well, instead of the gyroscope.

Figure 1:
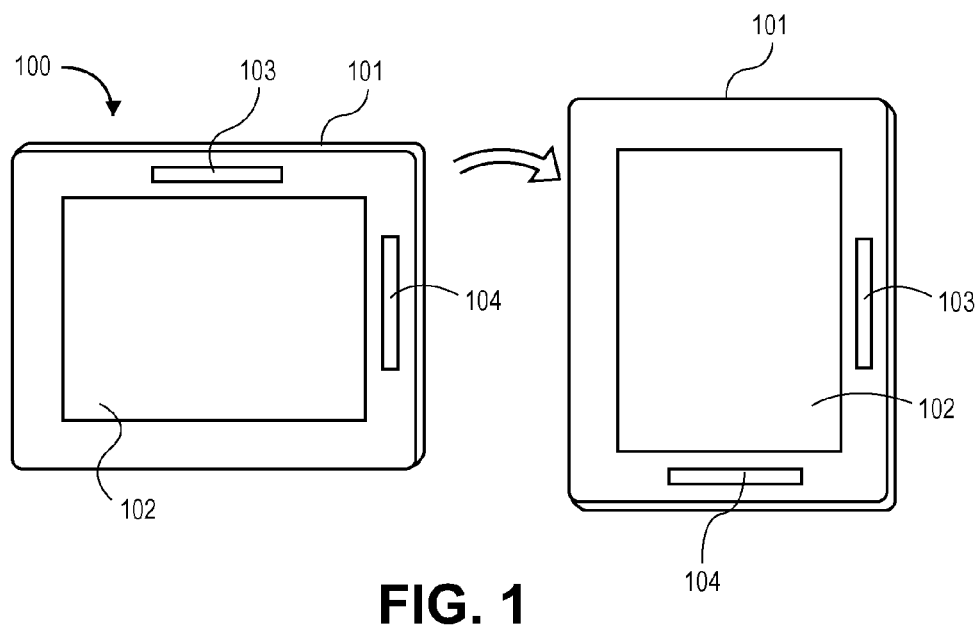
FIG. 1 is a pictorial diagram illustrating a location of one set of I/O devices along one edge of a handheld device and a second set of I/O devices along an adjacent edge of the handheld device.

FIG. 1 illustrates an example handheld device 100 that provides a mechanism that allows a user to communicate with others or access local or remote sites for uploading or downloading of information. Generally, handheld device 100 is a mobile device that may be operated by one hand or both hands. Device 100 may incorporate one or more types of communication capabilities and/or processing capabilities. Device 100 may incorporate one or more features of a telephone, computer, audio player, video player, other type of media player, media uploader, game console, accessing the Internet, as well as other functions. Some examples of device 100 are a smartphone, cellular phone, tablet media device, tablet computer (e.g. tablet PC), book reader, etc., as well as other types of handheld mobile devices with communication, computing and/or media playing capability. Further, it is to be noted that device 100 also includes sufficient memory to provide the storage of data in order to perform the desired or intended function or functions.

As shown in FIG. 1, device 100 typically has a case that encompasses a display 102 for displaying graphical images for viewing by the user. Device 100 is shown rectangular in shape to illustrate the applicability of both a portrait and landscape orientation for device 100. The left diagram of FIG. 1 shows a landscape (or horizontal) orientation, while the right diagram shows a portrait (or vertical) orientation. It is to be noted that device 100 may be square in shape. However, in that instance, there would not be a difference in shape orientation between portrait and landscape, so horizontal and vertical orientation would be more accurate in describing the two orientations for a square-shaped device 100. It is to be noted that device 100 may have other shapes as well, and need not be limited to a four-sided shape. A four-sided shape utilizing portrait and landscape designation is described herein, since many smartphones, tablets, etc. utilize the rectangular shape for the display and/or the device.

Device 100 includes a set of I/O device(s) 103 along one side (top edge in the diagram) and a duplicate set of I/O device(s) 104 along a second side (side edge in the diagram), which is adjacent to the first side. Set of device(s) 103 may include just one input device, one output device, a combination input/output device, or a plurality of such devices. Set of devices 104 includes devices that are equivalently duplicate device(s) found in the set of devices 103. Thus as noted, set of I/O device(s) 103 reside on one side edge, while a duplicate set of I/O device(s) reside on an adjacent side edge. Thus, in landscape orientation, I/O device(s) reside along the top edge, while a duplicate I/O device(s) reside along the right side edge in FIG. 1. It is to be noted that I/O devices 103 could have been located along the bottom edge. Likewise I/O devices 104 could have been located along the left side edge. In the example of FIG. 1, the duplication of the I/O device(s) along two adjacent edges allows one set of I/O devices to be always at the top or bottom edge no matter the orientation of device 100. This allows one set of I/O devices 103 or 104 to not be obscured if device 100 is handheld by the user along two opposing sides of device 100.

Figure 2:
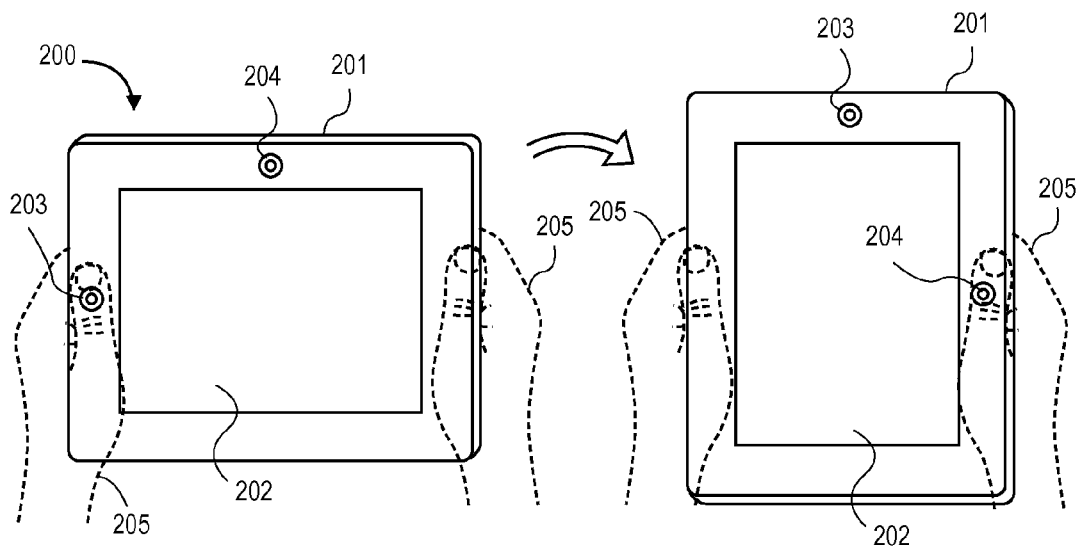
FIG. 2 is a pictorial diagram illustrating a location of a camera on one edge of a handheld device and a second camera on an adjacent edge of the handheld device, so that one camera is always uncovered by the user's hand when held in either the portrait or landscape orientation.

FIG. 2 illustrates the instance where one I/O device is obscured by the user holding the device, but the duplication of the I/O device along an adjacent side ensures that the other duplicate I/O device is not obscured. In FIG. 2, a handheld device 200 is shown having a case 201, display 202, camera 203 and a duplicate camera 204. Device 200 is equivalent to device 100 and is illustrated as a tablet media or computing device. Duplicate cameras 203, 204 are shown, but other I/O devices may be included as well. In the example of FIG. 2, camera 203 is along the left side edge in the landscape orientation and camera 204 is along the top edge. When rotated to the portrait orientation, camera 203 is now on top and camera 204 is along the right side edge.

As illustrated by hands 205, when device 200 is hand held in the landscape orientation, camera 203 along the left side edge may be covered by the hand. Camera 204 is not obscured by hands 205 and, therefore, available to perform its designated function. Note that camera 204 is located along the top edge in the landscape orientation, which is typically the desired location for a camera for a rectangular display. When device 200 is rotated to the portrait orientation, camera 204 is now covered by one of the hands 205, but camera 203 is not obscured to perform its designated function. Thus, whether the device 200 is in landscape orientation or portrait orientation, one camera is always uncovered when holding the device by both hands.

Figure 3:
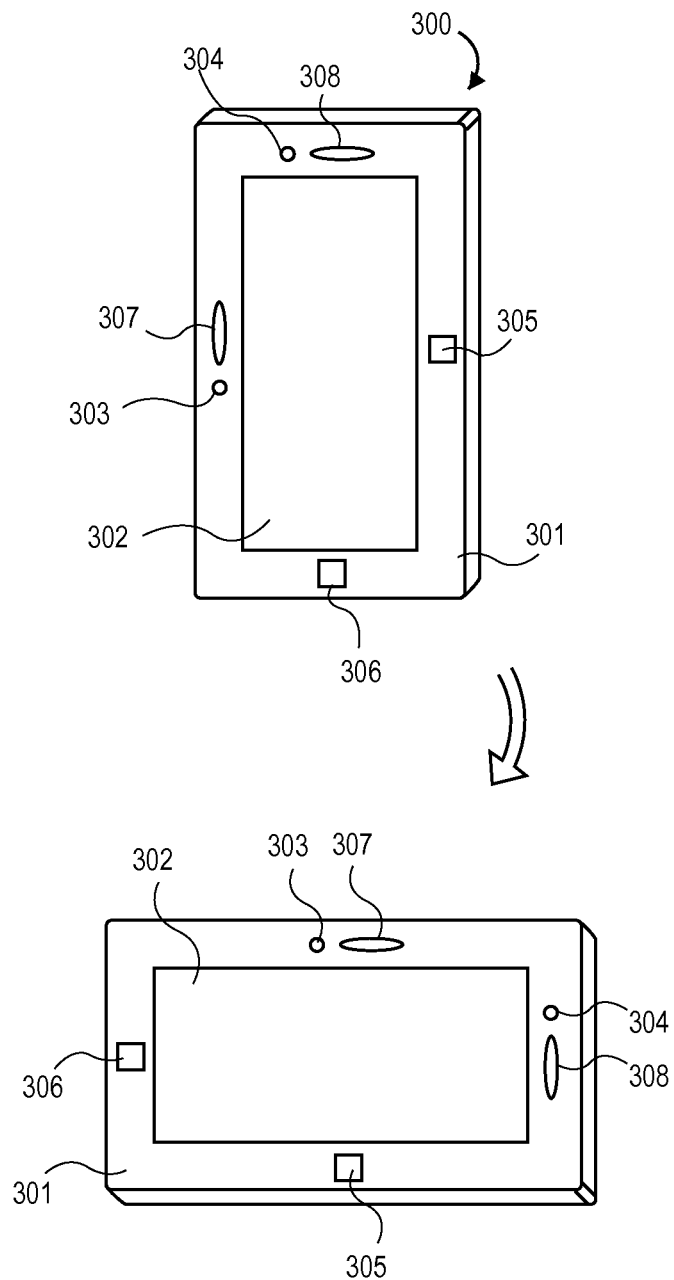
FIG. 3 is a pictorial diagram illustrating a set of microphone, speaker and camera and a duplicate set of microphone, speaker and camera at respective different edges from the first set, so that one set of microphone, speaker and camera are uncovered by the user's hand(s) in either portrait or landscape orientation.

FIG. 3, illustrates another example of duplicate I/O devices located on a face of a handheld device and along adjacent edges. In FIG. 3, a device 300, having a case 301 and display 302, is shown in two orientations. Device 300 is equivalent to device 100 and/or 200. Device 300 may be a tablet device, but the shown example is more of a smartphone. The top diagram shows device 300 in the portrait orientation with a speaker 308 and camera 304 along the top edge with a duplicate camera 303 and speaker 307 along the left side edge. A microphone 306 is located along the bottom edge and a duplicate microphone 305 is located along the right side edge. When device 300 is rotated clockwise to the landscape orientation, camera 303 and speaker 307 reside along the top edge and microphone 305 resides along the bottom edge. Camera 303, speaker 307 and microphone 305 now reside along the respective side edges.

In a typical operation for a handheld smartphone, when the user utilizes device 300 in portrait mode for a telephone conversation, the user's hand grasps device 300 along the long side edges. In this position, the hand will likely obscure camera 303, speaker 307 and microphone 305. However, camera 304, speaker 308 and microphone 306 are not covered and may have unobstructed use. When device 300 is rotated to the landscape orientation (e.g. for viewing a video or playing a game), device 300 is usually grasped along the sides so that the user's hands may obscure camera 304, speaker 308 and/or microphone 306. However, now duplicate devices, namely 303, speaker 307 and microphone 305, are not obscured to provide the intended functions previously provided by camera 304, speaker 308 and microphone 306. Thus, in either orientation, a set of camera, speaker and microphone 306 is available for unobstructed use.

Figure 4:
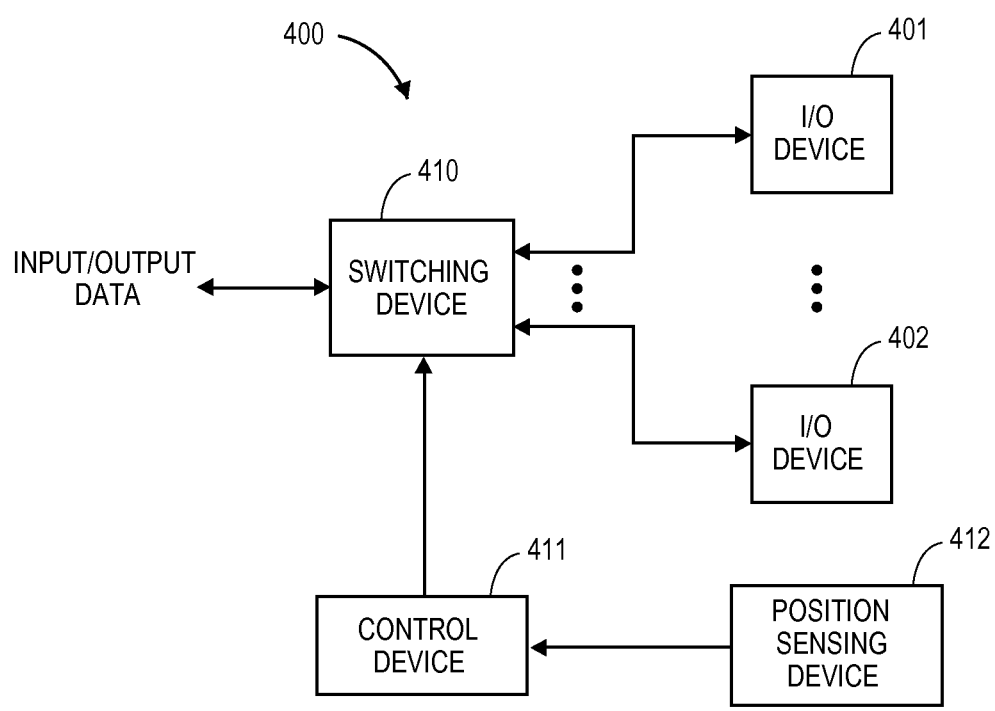
FIG. 4 is a block diagram of a circuitry that operates the various I/O devices based on orientation.

It is to be noted that the selection of which set of I/O devices to use may be manually selected by the user. However, a more efficient technique is to utilize a position sensor to sense the orientation of the handheld device so that the device may automatically select which set of I/O devices to activate and which set to deactivate. FIG. 4 shows one technique of utilizing a position sensing device to turn on and turn off the duplicated I/O devices.

In FIG. 4, one I/O device 401 is shown along with its duplicate device 402. For example, I/O device 401 may be camera 203 of FIGS. 2 and I/O device 402 may be camera 204 of FIG. 2. Although only one set of I/O devices 401, 402 is shown, circuit 400 may accommodate any number of such I/O devices. I/O devices 401, 402 are coupled to a switching device (or circuit) 410 which switches in one of the devices, effectively activating one of the devices 401/402 and deactivating the other device 402/401. The data input/output is via switching device/circuit 410 to the activated device of device pair 401/402.

A position sensing device 412 senses the orientation of the handheld device relative to the user and sends a position signal to a control device/circuit 411. Control device/circuit 411 receives the position information and determines which orientation is applicable and sends a signal to switching device/circuit 410 to activate the correct one of the pair of I/O devices 401, 402.

In one embodiment, a three-axis gyroscope is utilized as position sensing device/circuit 412 to sense the orientation of the handheld device relative to the user. It is to be noted that various other position sensing devices may be used as well. Furthermore, in current smartphones and tablet devices, a gyroscopic device is already present to rotate the display relative to user orientation of the handheld device. Accordingly, in practicing the present invention, existing position sensing devices/circuitry for display orientation may be coupled into or adapted for use as position sensing device 412 to operably control switching device circuit 410.

Figure 5:
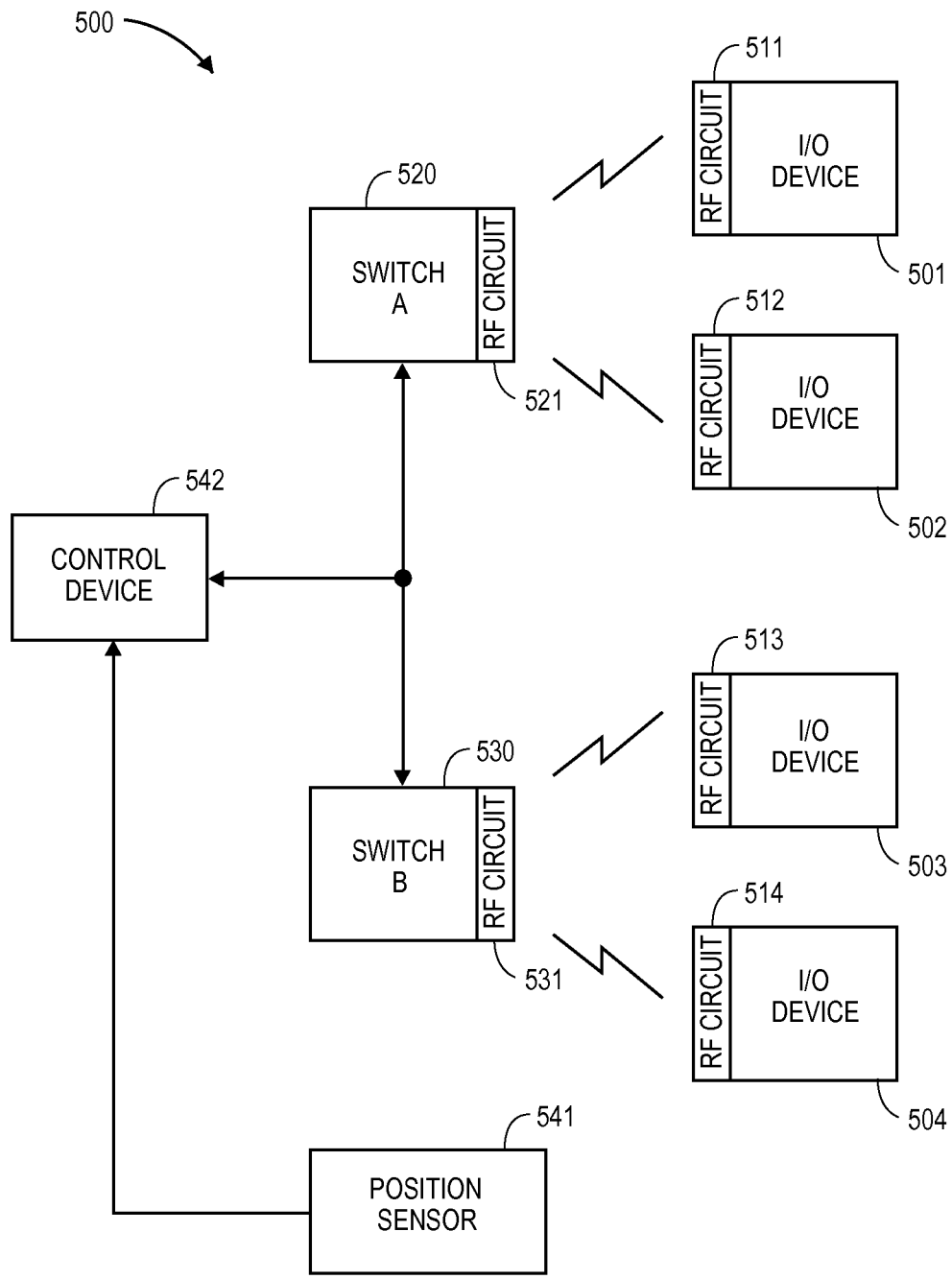
FIG. 5 is a block diagram of a circuitry that operates the various I/O devices based on orientation, similar to the device of FIG. 4, but utilizing a wireless connection between the I/O devices and the switching/control circuitry.

FIG. 5 shows a circuit 500, which is a further adaptation of circuit 400 of FIG. 4. In this instance circuit 500 is shown having two pairs of I/O devices 501/502 and 503/504. Again more (or less) devices may be present. I/O device pairs 501 and 502 are coupled to switch 520 (switch A) and I/O devices 503, 504 are coupled to switch 530 (switch B). A position sensor 541 and control device/circuit 542 are utilized equivalently to like devices 412, 411 of FIG. 4. Control device/circuit 542 controls the operation of switches A and B, where switch A selects between I/O devices 501 and 502 and where switch B selects between I/O devices 503 and 504.

One difference between circuit 400 and circuit 500 is that in circuit 500, a wireless link is established between I/O devices 501-504 and respective switches 520 and 530. Corresponding radio frequency circuitry 511, 512, 513, 514, 521 and 531 provide for wireless communication between the I/O devices and their respective switches. A wireless link is sometimes advantages, since the location of the various I/O devices may be at some distance from the switch and/or the controlling circuitry and running physical lines to the I/O devices may add additional complexity. A wireless communication link may be established utilizing any of a number of wireless protocols, including 802.11 protocol, Bluetooth™, millimeter wave protocol, as well as others.

Thus, by having duplicate I/O devices located along adjacent sides of a handheld device, in which the activation of a selected one of the I/O device is determined by the orientation of the handheld device, one I/O device is typically ensured to be unobstructed for intended use by the user.

As noted above, the actual number of such I/O devices or sensors may vary from device to device, depending on the particular use of the device. The examples above illustrated a four-sided handheld device (generally rectangular), but other shapes may be used. The intent is to have at least a pair of duplicate I/O devices located at two distant locations on a face or side of the device, so that when the device is handheld, at least one of the pair of devices will not be obstructed. The pair of duplicate devices need not be of exact duplication. For example, different types or models of cameras may be utilized instead of two identical cameras. Furthermore, the duplication need not be limited to just a pair of I/O devices. For example, three cameras may be used, one along the side and one each at the top and bottom, to provide for a camera at the top in landscape orientation, no matter which edge of the landscape orientation is placed a the top.

Furthermore, the examples herein illustrated I/O devices that are shown on one face of the handheld unit. However, duplication may be extended to sides of the device or even to opposite facing, such as front and back. For example, a microphone and/or a speaker may be located on a display side of the device and a duplicate microphone and/or speaker may be located on the back of the device. The microphone and speaker on the display side of the device may be directional, since the user will have the device close to the user's mouth and ear when utilizing the device as a phone. The speaker and microphone on the back may be more omni-directional for use in conferencing. When the user places the device face down onto a surface (such as a desk or table), the device senses the position and switches to the speaker and microphone on the back of the device, allowing the speaker and the microphone to operate in a conferencing mode. In this instance, the position sensing device senses the handheld device being placed onto a surface with the display side down and the switching devices activate the back speaker and microphone. Other embodiments may utilize other devices and placement at different locations on the device.

Additionally, the invention may be extended to other devices that are not normally handheld. For example, some computer monitors are rotatable 90 degrees to provide a portrait orientation, so that text documents may be viewed in portrait orientation to give it more height. One embodiment of the invention may place a duplicate set of cameras on the monitor, so that whether the display is in portrait or landscape, an operational camera is available at the top edge of the display in either orientation. Many more such examples abound for practicing the invention.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

I claim:

1. An apparatus comprising:
    a first image capturing device located along a first edge of the apparatus;
    a second image capturing device located along a second edge of the apparatus, the second edge being an adjacent edge to the first edge;
    a switching device to switch activation between the first and second image capturing devices;
    a position sensor to determine an orientation of the apparatus; and
    a control circuit configured with the position sensor and the switching device to select activation of the first image capturing device when the position sensor detects the apparatus in a first orientation and to select activation of the second image capturing device when the position sensor detects the apparatus in a second orientation.

2. The apparatus of claim 1, wherein the position sensor is a gyroscope and detects the second orientation as a position rotated from the first orientation.

3. The apparatus of claim 2, wherein the first orientation is a portrait orientation for a display of the apparatus.

4. The apparatus of claim 3, wherein the second orientation is a landscape orientation for the display of the apparatus.

5. The apparatus of claim 1, wherein the first and second image capturing devices are cameras.

6. The apparatus of claim 1, wherein the position sensor is a three-axis gyroscope.

7. The apparatus of claim 1, wherein the apparatus is a handheld phone.

8. The apparatus of claim 1, wherein the apparatus is a tablet media device.

9. The apparatus of claim 1, wherein the apparatus is a tablet computing device.

10. The apparatus of claim 1, wherein the apparatus is a book reader.

11. An apparatus comprising:
- a first camera located along a first edge of a handheld mobile device;
- a second camera located along an adjacent edge of the handheld mobile device from the first edge;
- a switching device to switch activation between the first and second cameras;
- a position sensor to determine an orientation of a display of the handheld mobile device; and
- a control circuit configured with the position sensor and the switching device to select activation of the first camera when the position sensor detects the display in a portrait orientation and to select activation of the second camera when the position sensor detects the display in a landscape orientation.

12. The apparatus of claim 11, wherein the handheld mobile device is a handheld phone.

13. The apparatus of claim 11, wherein the handheld mobile device is a tablet media device.

14. The apparatus of claim 11, wherein the handheld mobile device is a tablet computing device.

15. The apparatus of claim 11, wherein the handheld mobile device is a book reader.

16. The apparatus of claim 11, wherein the position sensor is a three-axis gyroscope.

17. The apparatus of claim 11, further including a first speaker and a second speaker along two different edges of the handheld mobile device.

18. The apparatus of claim 11, further including a first microphone and a second microphone along two different edges of the handheld mobile device.

19. A method comprising:
- sensing a display of a handheld mobile device to be in a portrait orientation or a landscape orientation;
- activating a first camera that is located along a first edge of the handheld mobile device when the display is sensed to be in a portrait orientation;
- activating a second camera that is located along an adjacent edge of the handheld mobile device from the first edge when the display is sensed to be in a portrait orientation; and
- switching activation between the first and second cameras dependent on which orientation is sensed for the display.

20. The method of claim 19, wherein the sensing of the portrait and landscape orientations is performed by a three-axis gyroscope.

* * * * *